(12) United States Patent
Armstrong et al.

(10) Patent No.: US 9,337,470 B2
(45) Date of Patent: May 10, 2016

(54) METHOD AND APPARATUS FOR IN-SITU DRYING INVESTIGATION AND OPTIMIZATION OF SLURRY DRYING METHODOLOGY

(71) Applicant: UT-BATTELLE, LLC, Oak Ridge, TN (US)

(72) Inventors: Beth L. Armstrong, Clinton, TN (US); Claus Daniel, Knoxville, TN (US); Jane Y. Howe, Oak Ridge, TN (US); James O. Kiggans, Jr., Oak Ridge, TN (US); Adrian S. Sabau, Knoxville, TN (US); David L. Wood, III, Knoxville, TN (US); Sergiy Kalnaus, Knoxville, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 719 days.

(21) Appl. No.: 13/656,020

(22) Filed: Oct. 19, 2012

(65) Prior Publication Data
US 2014/0113062 A1   Apr. 24, 2014

(51) Int. Cl.
*B05D 3/02* (2006.01)
*B05D 3/06* (2006.01)
*H01M 4/04* (2006.01)

(52) U.S. Cl.
CPC .............. *H01M 4/04* (2013.01); *H01M 4/0435* (2013.01); *H01M 4/0471* (2013.01); *H01M 4/0485* (2013.01)

(58) Field of Classification Search
CPC ................ H01M 4/04; H01M 4/0409–4/0416; H01M 4/042; H01M 4/0435; H01M 4/0471

USPC ......... 427/8–9, 541–544, 366, 370, 377, 378, 427/379, 380; 264/406, 410, 40.1, 40.6, 264/40.7
See application file for complete search history.

(56) References Cited

U.S. PATENT DOCUMENTS

| | | | | |
|---|---|---|---|---|
| 3,697,267 | A * | 10/1972 | Uber | 430/65 |
| 5,885,493 | A * | 3/1999 | Janney et al. | 264/37.18 |
| 7,241,411 | B2 * | 7/2007 | Berry et al. | 264/160 |
| 8,956,688 | B2 * | 2/2015 | Li et al. | 427/115 |
| 9,023,528 | B2 * | 5/2015 | Liang et al. | 429/231.8 |
| 2001/0015509 | A1 * | 8/2001 | Tiegs et al. | 264/104 |

(Continued)

OTHER PUBLICATIONS

Webster's Ninth New Collegiate Dictionary; Merriam-Webster incorporated, publishers; Springfield, Massachusetts, USA; 1990 (no month), excerpt p. 1111.*

(Continued)

*Primary Examiner* — Marianne L Padgett
(74) *Attorney, Agent, or Firm* — Scully Scott Murphy & Presser (57) ABSTRACT

A method of drying casted slurries that includes calculating drying conditions from an experimental model for a cast slurry and forming a cast film. An infrared heating probe is positioned on one side of the casted slurry and a thermal probe is positioned on an opposing side of the casted slurry. The infrared heating probe may control the temperature of the casted slurry during drying. The casted slurry may be observed with an optical microscope, while applying the drying conditions from the experimental model. Observing the casted slurry includes detecting the incidence of micro-structural changes in the casted slurry during drying to determine if the drying conditions from the experimental model are optimal.

7 Claims, 7 Drawing Sheets

(56) References Cited

U.S. PATENT DOCUMENTS

| | | | |
|---|---|---|---|
| 2009/0246636 A1 | 10/2009 | Chiang et al. | |
| 2011/0052998 A1* | 3/2011 | Liang et al. | 429/300 |
| 2011/0189379 A1* | 8/2011 | Ortner et al. | 427/9 |
| 2012/0052101 A1* | 3/2012 | Berry et al. | 424/401 |
| 2014/0038042 A1* | 2/2014 | Rios et al. | 429/211 |
| 2014/0159265 A1* | 6/2014 | Maurer et al. | 264/40.1 |
| 2015/0188120 A1* | 7/2015 | Li | H01M 4/0404 427/8 |

OTHER PUBLICATIONS

S.K. Martha et al.; "Advanced Lithium Battery Cathodes Using Dispersed Carbon Fibers as the Current Collector", Journal of the Electrochemical Society; 158 (9), pp. A1060-A1066, Jul. 20, 2011.*

M.A. Janney et al.; "Microwave Processing of Ceramics: Guidelines Used at the Oak Ridge National Laboratory"; Materials Research Society Symposium Proceedings, vol. 269; 1992 (no month), pp. 173-185.*

I.W. Eames et al.; "The Evaporation Coefficient of Water: a review"; Int. Journal Heat Mass Transfer; vol. 40, No. 12; 1997 (no month); pp. 2963-2973.*

Robert Holyst et al.; "Evaporation into Vacuum: Mass flux from momentum flux and the Hertz-Knudsen relationship revisited"; the Journal of Chemical Physics, vol. 130, Feb. 20, 2009 (published online); pp. 074707-1 through 074707-6.*

Y.T. Cheng et al.; "Diffusion-Induced Stress, Interfacial Charge Transfer, and Criteria for Avoiding Crack Initiation of Electrode Particles"; Journal of the Electrochemical Society, 157 (4), Mar. 10, 2010; pp. A508-A516.*

S. Kalnaus et al.; "A study of lithium-ion intercalation induced fracture of silicon particles used as anode material in Li-ion battery", Journal of Power Sources, vol. 196; May 27, 2011; pp. 8116-8124.*

* cited by examiner

FIG. 9

METHOD AND APPARATUS FOR IN-SITU DRYING INVESTIGATION AND OPTIMIZATION OF SLURRY DRYING METHODOLOGY

REGARDING FEDERALLY SPONSORED RESEARCH OR DEVELOPMENT STATEMENT

This invention was made with government support under Contract Number DE-AC05-00OR22725 between the United States Department of Energy and UT-Battelle, LLC. The U.S. government has certain rights in this invention.

FIELD OF THE INVENTION

The present disclosure relates to apparatus and methods for an in-situ drying of ceramic (or metal) slurries. More specifically, in some embodiments, the methods disclosed herein provide for in-situ drying of cast lithium containing slurries for forming batteries.

BACKGROUND

Electrode processing for lithium ion batteries and other applications using slurry casting techniques typically require drying of the casted film or coating. Typically, drying procedures are determined and "optimized" by trial and error using a variety of drying temperatures, times, casting thicknesses, solid loadings and slurry compositions with binder, surfactants and other additives. In a tedious study of different drying temperatures and times, a coating is produced and characterized for flaws, such as cracking and delamination, after the drying. If integrity is determined and no flaws are detected, the optimization is finished and a coating drying procedure is determined.

However, this drying procedure is typically not a truly optimized procedure. This non-optimized procedure often results in higher costs than necessary. Additionally, slight changes in material, slurry composition, pH value of the slurry, and changes in additives (knowingly or unknowingly) can result in a highly non-optimized procedure after the change and the drying procedure has to be determined from scratch.

SUMMARY OF THE INVENTION

In one embodiment of the present disclosure, a method of drying casted slurries is provided that includes calculating drying conditions from an experimental model for a cast slurry. Thereafter, a cast slurry is formed, and an infrared heating probe (i.e., 60 or 61 in FIG. 1) is positioned on one side of the cast slurry, and a thermal probe (i.e., 60 or 61 in FIG. 1) is positioned on an opposing side of the cast slurry. The infrared heating probe may control the temperature of the cast slurry during drying. The cast slurry may then be quantitatively evaluated with a microscope for microstructural changes during drying in accordance with the experimental model to determine if the drying conditions are optimal. The experimental model may be used to determine the heat that is required to go into the system for optimized drying; the heat that is lost through the system by evaporation of the solvent; the amount of shrinkage in the cast slurry during drying; and the stress and strain that is formed in the cast slurry during drying. The microstructural changes that can be quantified with a microscope that can indicate that the drying procedure has not been optimized include protuberances, cracks, blisters, delamination and combinations thereof in the cast slurry.

BRIEF DESCRIPTION OF THE DRAWINGS

The following detailed description, given by way of example and not intended to limit the disclosure solely thereto, will best be appreciated in conjunction with the accompanying drawings, wherein like reference numerals denote like elements and parts, in which.

DETAILED DESCRIPTION

Detailed embodiments of the present disclosure are described herein; however, it is to be understood that the disclosed embodiments are merely illustrative of the compositions, structures and methods of the disclosure that may be embodied in various forms. In addition, each of the examples given in connection with the various embodiments are intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the compositions, structures and methods disclosed herein. References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment.

Figure 1:
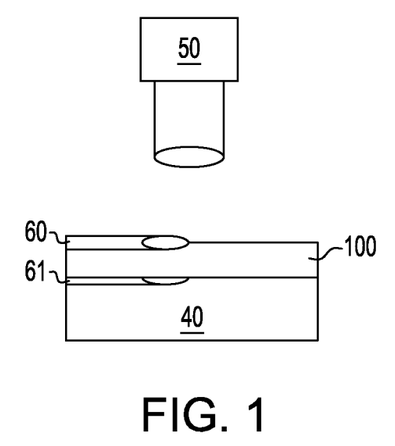
FIG. 1 is a schematic view of an apparatus for observing cast slurries during drying, in accordance with one embodiment of the present disclosure.

In one embodiment, an apparatus, a method, and a modeling procedure is provided to optimize a drying methodology for slurry processing, film casting and coating casting. The disclosed methods and structures allow for an in-situ observation of drying phenomena and the mechanisms that occur during drying of ceramic-particle-containing slurries and the development of flaws in the coating of cast slurries as they appear. The procedure can optimize the drying methodology for time and flawlessness in coating development and slurry drying. Referring to FIG. 1, in one embodiment, an infrared spot heater 61, i.e., infrared heating probe, is combined with a digital microscope 50, a balance 40, and a thermal probe 60 to dry a casting slurry 100 and measure mass loss, evaporation rate, shrinkage, and crack or flaw development. Optimization can be tuned based on measurements and understanding resulting from drying simulation and modeling.

In some embodiments, the drying studies may be applied to casted slurries for use in forming lithium (Li) ion batteries. Some compositions that are employed in lithium (Li) ion batteries include lithium cobalt oxide (LCO), lithium iron phosphate (LFP), lithium manganese oxide (LMO), lithium nickel cobalt aluminum oxide (NCA), lithium titanate (LTO), lithium nickel manganese cobalt oxide (NMC) and combinations thereof. Other compositions that are suitable for use as casting slurries for forming the electrodes of lithium (Li) batteries include $LiCoO_2$, $LiMn_2O_4$, $LiNiO_2$, $LiFePO_4$, $Li_2FePO_4F$, $LiCo_{1/3}Ni_{1/3}Mn_{1/3}O_2$, $Li(Li_aNi_xMn_yCo_z)O_2$, $LiC_6$, $Li_4Ti_5O_{12}$, $Li_{4.4}Si$, $Li_{4.4}Ge$, $LiPF_6$, $LiAsF_6$, $LiClO_4$, $LiBF_4$, $LiCF_3SO_3$, and combinations thereof. As used herein, the term "slurry" is a liquefied suspension of clay particles in water. In some embodiments, the cast slurry that is formed to provide the electrode may be formed using a roll to roll casting apparatus or a tape casting apparatus. In some embodiments, a roll to roll casting method or a tape casting method is used to the cast slurry on a foil substrate. The foil substrate is typically composed of a metal, such as Al, Cu, a porous electrode coating sandwiched between Al, Cu or a combination thereof.

The cast slurry is a liquid system with free flowing particles. As the cast slurry is dried, the liquid component, i.e., solvent, of the system evaporates. At one stage, the amount of liquid, i.e., solvent, evaporates so that the remaining particles, i.e., solid content, of the cast slurry contact one another, which results in a stress. The stress that is formed in the cast slurry may be a tensile stress. If the stress that is formed in the cast slurry surpasses the strength of the coating, the coating of the cast slurry cracks. If the tensile stress in the cast slurry surpasses the adhesive strength of the cast slurry, the cast slurry can delaminate from the substrate, on which it is deposited. The methods and structures disclosed herein provide for optimization of the drying procedures to avoid the cracking, delamination and other damage to the cast slurry during drying.

The method may include calculating at least one of temperature for drying the cast slurry, the amount of evaporation required for drying the cast slurry, and the stress that is formed in the cast slurry as dried. Using at least one of these calculated values, and the apparatus depicted in FIG. 1, a drying procedure may be established. More specifically, in some embodiments, an infrared heating probe 60 may be applied to a cast slurry 100, i.e., casting, with a thermal probe 61 underneath the cast slurry 100 in order to control the temperature of the slurry during drying. The slurry may also be heated with dircctd directed hot air gas or induction heating.

A microscope 50, such as an optical microscope or a digital microscope, is used to observe the cast slurry 100 during drying. The resolution of the microscope 50 is selected so that the protuberances, micro-structural changes, cracks, blisters and similar features in the cast slurry 100 may be detected as the cast slurry 100 is dried. The microscope 50 allows for simultaneous observation of the cast slurry 100 as it dries and loses its solvents, wherein the cast slurry 100 shrinks and the film or coating solidifies. The balance 40 is applied to determine the mass loss during the drying procedure that allows for precise calculation of the solvent evaporation during drying as a function of time. In some embodiments, using the combination of the infrared heating probe 60, the thermal probe 61, the microscope 50, and the balance 40, a precise timing of the drying procedure for the cast slurry 100 can be determined, and details about the individual drying steps can be measured. In doing so, the solvent evaporation can be measured and times of important events such as coherency point can be recorded. The "coherency point" is the time at which particles in the slurry 100 start to touch each other and stress and strain can develop during drying. The stress and strain that results at the coherency point during can be similar to sintering like behavior.

In one embodiment, the procedure can be paired with a mathematical drying model in order to understand the measurement and allow for adjustments in slurry composition, solid loading, viscosity, wet thickness, drying temperature and temperature evolution and drying time. For example, in some embodiments, a mass transfer model for simulating drying can be employed to handle the variation of coating thickness during drying. The energy equation is solved over a fixed thickness domain and a coordinate transformation is employed. The decrease in the amount of liquid phase and the increase in the amount of solid phase within the slurry casting were considered during drying. During drying the solvent evaporates and the coating thickness decreases by almost an order of magnitude, the actual coating thickness has to be taken into account when the temperature for drying is determined. The coating is assumed to shrink uni-directionally during drying, i.e., in the direction normal to the substrate surface. The substrate for the slurry casting is a foil for the lithium electrode. Since the foil thickness is very small, the heat transfer in the normal direction through the foil and the coating thickness was considered while the heat transfer in the in-plane directions was neglected. The foil translation was handled by considering that the top surface of the coating that the bottom surface of the foil are exposed to time dependent condition that include convection temperatures, radiation temperatures, and convection heat transfer coefficients. Thus, the heat transfer exchange between the foil and the rolls of the casting apparatus was not explicitly considered. Instead, the heat transfer coefficients were altered to account for the additional cooling due to contact between the foil and roll.

Figure 2A:
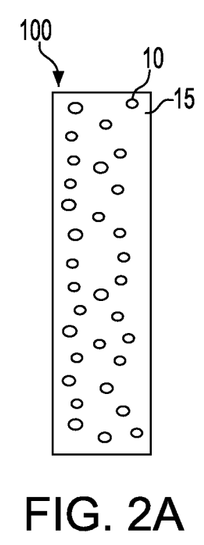
FIGS. 2A-2C are schematic views of a cast slurry for forming lithium electrodes depicting shrinkage of the cast slurry with increased drying time and increased solids fraction, in accordance with one embodiment of the present disclosure.
Figure 2B:
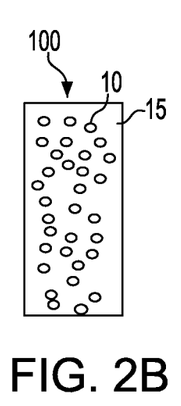
Figure 2C:
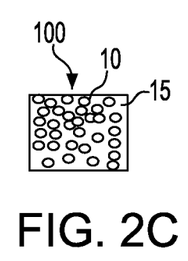

In some embodiments, the drying module of the mass transfer model can have the following capabilities:

1) Calculating the shrinkage of the coating.
2) Determining the variation of faction of solids (inorganic and polyvinylidene fluoride (PVDF)) in the coating during drying. More specifically, as the solvent 15 evaporates, the amount of solid fractions 10 increase, as depicted in FIGS. 2A-2C. FIGS. 2A-2C also depict shrinkage of the coating of the casting slurry 100, as the casting slurry 100 is dried. FIG. 2A depicts the coating as a cast slurry 100 prior to drying. FIG. 2B depicts the as cast slurry 100 during initial drying, in which a portion of the solvent 15 is removed and the coating of the cast slurry 100 shrinks, i.e., the thickness of the coating of the cast slurry 100 is reduced. FIG. 2C depicts final drying of the coating of the cast slurry 100, in which the coherency point of the slurry is reached. The progression in drying depicted in FIGS. 2A-2C depicts that the solid fractions 10 increase and the shrinkage of the coating of the casting slurry 100 increases with drying of the slurry.
3) Variation of properties, e.g., specific heat, thermal conductivity and density, with the amount of solids in the coating is considered.
4) Evaporation of the solids is considered based on a Hertz-Knudsen equation or mass transfer coefficients, as described in Welty, J. R., C. E. Wicks, and R. E. Wilson, 2007, "Fundamentals of Momentum, Heat, and Mass Transfer," Fifth Ed., John Wiley & Sons, New York and Eames I W, Marr N J, and Sabir H, The evaporation coefficient of water: A review, 1997, International Journal of Heat and Mass Transfer, Vol. 40, pp. 2963-2973, which are both incorporated herein by reference.

Figure 3:
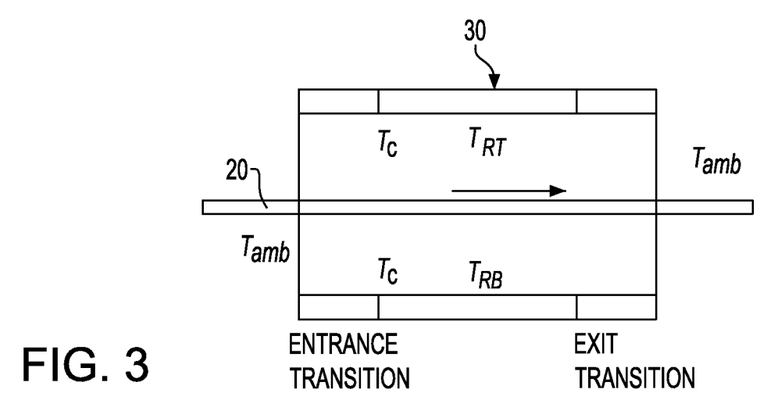
FIG. 3 is a schematic view of the foil that the slurry is casted on being traversed through an oven, in which transition regions are present at the entrance of the oven and exit from the oven, wherein the different temperatures of the oven walls are also shown, in accordance with one embodiment of the present disclosure.

The drying apparatus is typically considered for the mass transfer equation. The coating, i.e., casting slurry 100, is typically deposited on the foil 20 that is dried using a combination of infra-red heaters and an oven 30, as depicted in FIG. 3. In some embodiments, a heating pad is placed on the bottom of the oven 30 to provide the radiant heat in the oven 30. The temperature of the heating pad is denoted as Tj to indicate that the pad would exchange heat by radiation with the foil 20 and other oven 30 components. The temperature of the air in the oven 30 is denoted as $T_C$, which is different than the temperature of the walls of the oven 30. The temperature of the top oven wall is denoted as $T_{RT}$. Typically, aside from the ambient air $T_{amb}$ outside the oven 30, only the temperature of the heating pad $T_{RB}$ is directly known. In some embodiments, within the entrance and exit transition regions, the variation in heating conditions is not trivial. For example, the temperature of the air $T_C$ in the oven 30 is not constant but is dependent by the amount of air at $T_{amb}$ that enters the oven 30.

Also, the thermal radiation conditions that are outside the oven 30 are different than those inside the oven 30. In the current model, in order to handle the entrance and exit transition regions, Tc, $T_{RB}$, and $T_{RT}$ would be varied. Because of the variation of temperature within the oven 30 it can be difficult to know the actual temperature of the slurry casting 100 during the drying process.

The solid phase of the coating 100 of the slurry casting is considered to include the binder in addition to the solid particles, while the liquid phase is made of solvent. The following relationships (equation 1) are used to relate the mass fractions, f, and volumetric fractions, g, and density, ρ, of the constituents in the coating through the phase densities and average density, $\bar{\rho}$.

$$\bar{\rho} = g_s \rho_s + g_L \rho_L + g_a \rho_a, \quad (1)$$
$$\frac{1}{\bar{\rho}} = \frac{f_s}{\rho_s} + \frac{f_L}{\rho_L} + \frac{f_a}{\rho_a},$$
$$f_i = g_i \frac{\rho_i}{\bar{\rho}},$$

where i=s, L, and a are used as subscripts for the solid, liquid, and air phases, respectively. Equations (1) provide a description of the volume fractions in the coating of the cast slurry. The air is considered to penetrate into the coating only after the coherency, i.e., actual contact between particles, as depicted in FIG. 2C. The mass flux of solvent is calculated differently before and after coherency. It is considered that before the coherency point, the evaporation occurs over the entire surface area of the coating, as depicted in FIGS. 1A and 1B. After the coherency point is reached, as depicted in FIG. 1C, the evaporation is considered to occur only through the open area, i.e. the open are that is not obstructed by the solid particles 10. Also after the coherency point, the capillary pressure due to the inter-particle menisci, typically plays an important role in the evaporation.

Since the mass of solids is constant, at any given instant, the coating height can be related to the initial height through the volumetric fraction of solids, as:

$$H(t) = H(0) \frac{g_s(0)}{g_s(t)} \quad (2)$$

where H(t) is the current coating thickness at time "t", H(0) is the initial coating thickness, $g_s(0)$ is the initial volumetric fraction of solids, and $g_s(t)$ is the final volumetric faction of solids. All the variables at current time "t" are solved through an iterative process until convergence would be attained. The following data in table is one example of data that can be used at the input to equation 2.

Table 1. Data on the initial and final conditions of the coating.

TABLE 1

Data on the initial and final conditions of the coating.

| Initial coating thickness [mm] | Final coating thickness [mm] | Initial mass fraction of solids | Initial volumetric fraction of solids | Final volumetric fractions of solids |
|---|---|---|---|---|
| H(0) | H(t_f) | f_s(0) | g_s(0) | g_s(t_f) |
| 0.2 | 0.0121 | 0.1 | 0.0485 | 0.8 |

For the data in Table 1, it was assumed that initially, the coating of the casting slurry had 10% solids and that its thickness was 0.2 mm. It was also considered the final volumetric fraction of the solids was 80%. This high packing fraction can be obtained as the solid phases consists of irregular shaped particles and not of simple spherical particles of uniform size for which the maximum packing fraction is 67%.

In one embodiment, the final coating thickness $H(t_f)$ provided by the above described calculations can be measured optically at the end of the experimental run or using the digital microscope 50 depicted in FIG. 1. Moreover, in some embodiments a laser system can be used to measure the instantaneous coating thickness $H(t)$ as the coating is being dried. This data can be used to determine the optimized drying schedule of a cast slurry 100.

In another embodiment, an energy transport model is provided to determine boundary conditions that are suitable to provide the temperature of the system that can provide for optimum drying. In some embodiments, the following energy transport model can provide the heat to be applied to the cast slurry to provide for optimized drying. The energy equation, which describes the heat conduction phenomena for a fixed computational domain, appears as:

$$\overline{\rho C_p} \frac{\partial T}{\partial t} = \frac{\partial}{\partial x}\left(k \frac{\partial T}{\partial x}\right) + \frac{\partial}{\partial y}\left(k \frac{\partial T}{\partial y}\right) + \frac{\partial}{\partial z}\left(k \frac{\partial T}{\partial z}\right) \quad (3)$$

Where ρ is the density, t is the time, and T is the temperature. (Cp is the specific heat of the slurry, is T the temperature of the cast slurry). The overbar indicates average quantities. In order to solve the energy equation on a fixed computational domain, without explicitly tracking the displacement of the mesh vertices within the coating, a coordinary transformation was imposed in the direction that is normal to the substrate surface, say z-direction. The coordinate transformation is:

$$Z = z_0 + (z - z_0) \frac{H_0}{H(t)} \quad (4)$$

where $z_0$ is the coordinate at which the coating starts, $H_0$ is a reference thickness, $H_{(t)}$ is the thickness of the coating at the current time, t. This coordinate change is applied only to the coating domain. In this way, the computational domain is always constant, i.e., from Z=0 on the back side of foil (or substrate), to Z=$z_0$ on the back side of the coating in contact with the substrate, to Z=$z_0$+$H_0$ on the top surface of the coating. Employing the coordinate transformation, the energy equation (3) is changed only in the coating domain, as:

$$\overline{\rho C_p}\left[\frac{\partial T}{\partial t} - \frac{\partial T}{\partial Z}\frac{Z-z_0}{H}\frac{dH}{dt}\right] = \frac{\partial}{\partial x}\left(k\frac{\partial T}{\partial x}\right) + \frac{\partial}{\partial y}\left(k\frac{\partial T}{\partial y}\right) + \frac{1}{H^2}\frac{\partial}{\partial Z}\left(k\frac{\partial T}{\partial Z}\right) \quad (5)$$

This right hand side (RHS) of this equation is to that of the anisotropic heat transfer equation, i.e., energy equation (3), with a thermal conductivity in the Z direction different than that in the x and y directions. Since the coordinate transformation is applied only to the coating domain, the boundary conditions between the coating domain and the substrate layer adjacent to it must be reformulated. The boundary conditions include heat transfer losses due to natural convection and radiation at the foil surface. The boundary conditions are imposed such that the heat flux loss is:

$$q''=h_R(T-T_R)+h_e(T-T_C) \quad (6)$$

where $h_R$ is the heat transfer coefficient due to a radiation temperature of $T_R$, $h_C$ is the heat transfer coefficient due to a gas convection at a temperature of $T_C$ as illustrated in FIG. 3 (The subscript RT and RB in FIG. 3 indicates the radiation temperature of the top and bottom surfaces of the oven, respectively). T is the temperature of the sample surface. In this work, $h_C$ was varied in each regions and:

$$h_R = \sigma \epsilon (T^2 + T_R^2)(T + T_R)$$

where σ is the Stefan-Boltzmann constant and ε is the emissivity of the sample surface.

The optimum drying procedure is determined iteratively in several steps involving both the apparatus depicted in FIG. 1 and computer simulations of the drying. First, the model has to be validated for the each slurry/foil combination. Once the model is validated, then several drying scenarios can be simulated, targeted experiments can be conducted, and an optimum drying schedule can be identified to meet the specific optimization criteria, such as high quality coating, short drying times, and others.

In one embodiment, in addition to determining the heat needed for optimum drying, the methods disclosed herein also provide for an understanding of the heat that is lost by the system through evaporation during the drying process. The amount of solvent evaporation can be evaluated using Langmuir-like equations. The Langmuir equations relate the outgassing rate and the vapor pressure of a homogenous monomolecular weight material in high vacuum. The net evaporated mass flow rate, m, is the difference between the evaporated and condensed mass flow rate. Neglecting the partial pressure of the evaporated gas phase of the solvent at larger distances from the surface, the evaporated ṁ is given based on Hertz-Knudsen equation as a function of the surface temperature, Ts, saturated vapor pressure, Ps (corresponding to Ts), M (molecular mass) and universal gas constant, R, as:

$$\dot{m}_e = \beta P_s \sqrt{\frac{M}{2\pi R T_s}} \quad (8)$$

where β is an empirical evaporation coefficient that can be determined experimentally or through molecular dynamics simulations and the saturated vapor pressure that are given by the Clausius-Clapeyron equation, as:

$$P_s(T)=P_0 \exp[-(1/T-1/T_0)H_v/R] \quad (9)$$

wherein Po is the reference pressure at a reference temperature, $T_0$, and Hv is the enthalpy of vaporization.

During a time step, Δt, the solvent fraction, $g_L$, would decrease based on the evaporated mass flux of solvent, $\Delta Q_L$, as:

$$g_L(t+\Delta t) = g_L(t) - \Delta Q_L \frac{1}{H(t)_{QL}} \quad (10)$$

The mass flux of solvent is calculated differently before and after coherency. It is considered that before coherency point, the evaporation occurs over the entire surface area of the coating, as depicted in FIG. 1B. After the coherency point is reached, the evaporation is considered to occur only through the open area, i.e. that is not obstructed by the solid particles, as depicted in FIG. 1C, and a factor is used to adjust to evaporated flow rate by accounting for the flow through the permeable media. The mass flux of solvent is given by the solvent mass evaporation rate, as:

$$\Delta Q_L = \Delta t \dot{m}_L \quad (11)$$

Figure 4A:
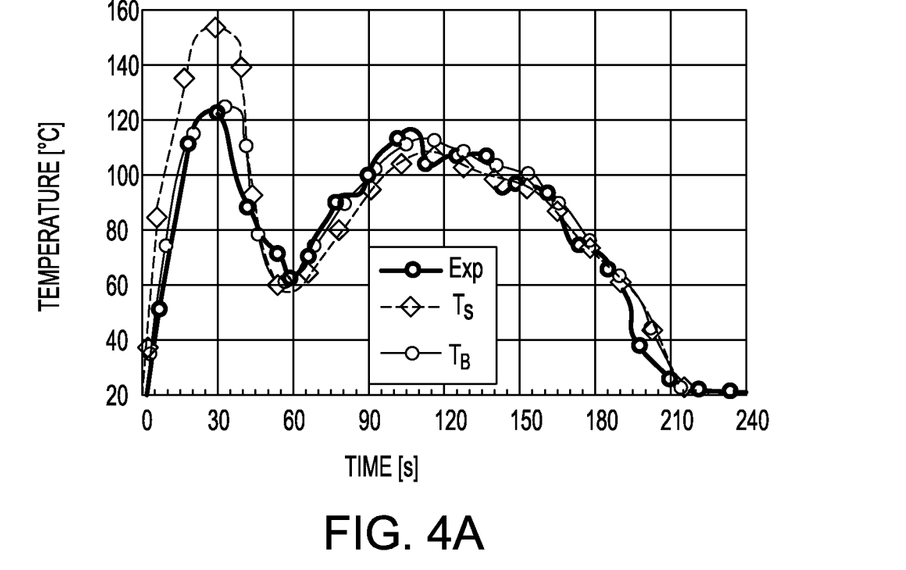
FIG. 4A is a plot of the experimental and the computed temperature results for the drying of a foil coated with the casting slurry as a function of time with a foil speed of 35 cm/min and an empirical evaporation factor ($\beta$) equal to 1.0e-5, in accordance with one embodiment of the present disclosure.
Figure 4B:
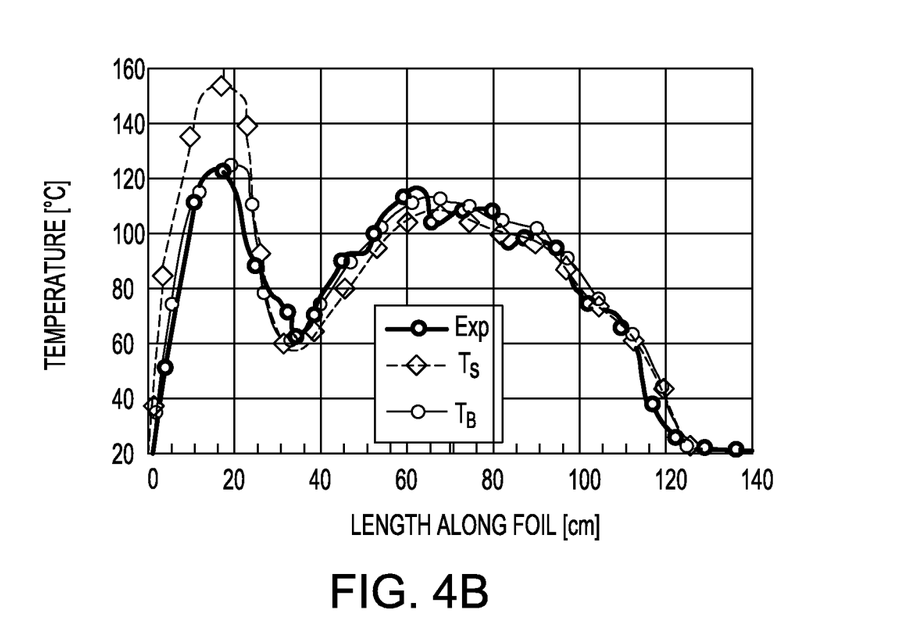
FIG. 4B is a plot of the experimental and the computed temperature results for the drying of a foil coated with the casting slurry as a function of the length along the foil with a foil speed of 35 cm/min and an empirical evaporation factor ($\beta$) equal to 1.0e-5, in accordance with one embodiment of the present disclosure.
Figure 5A:
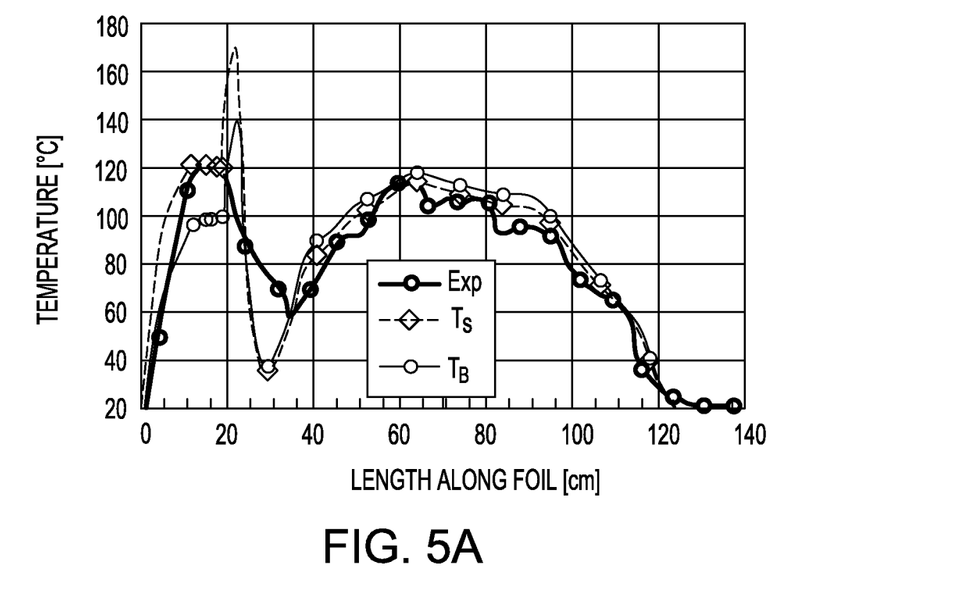
FIG. 5A is a plot of the experimental and computed temperature for drying the coating of the cast slurry as a function of the length along the foil at a foil speed of 35 cm/min with an empirical evaporation factor ($\beta$) equal to 5.0e-4, in accordance with one embodiment of the present disclosure.
Figure 5B:
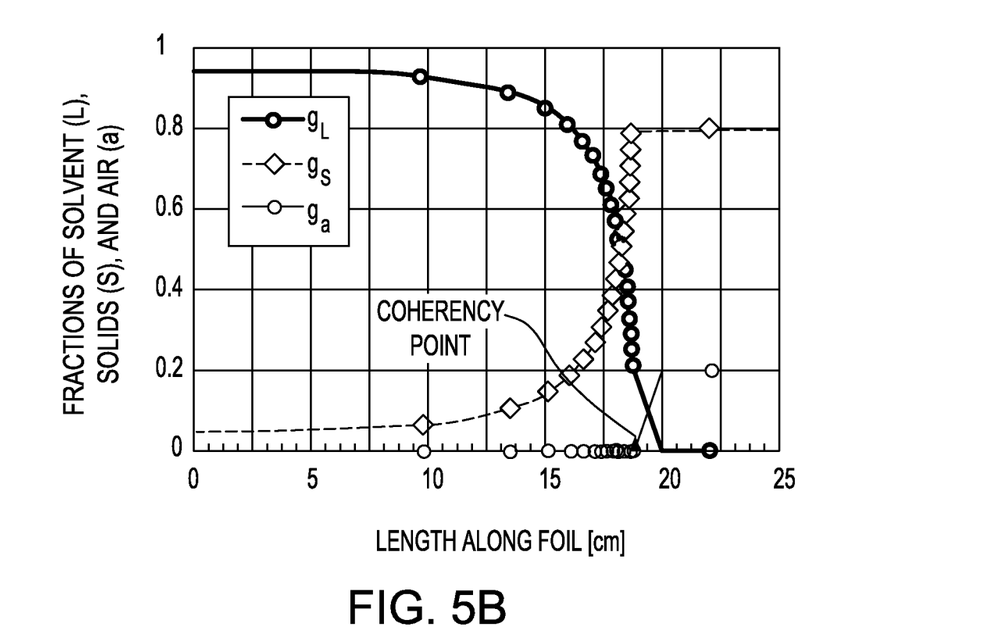
FIG. 5B is a plot of the fractions of solvent (L), solids (s) and air (a) for drying the coating of the cast slurry as a function of the length along the foil at a foil speed of 35 cm/min with an empirical evaporation factor ($\beta$) equal to 5.0e-4, in accordance with one embodiment of the present disclosure.
Figure 5C:
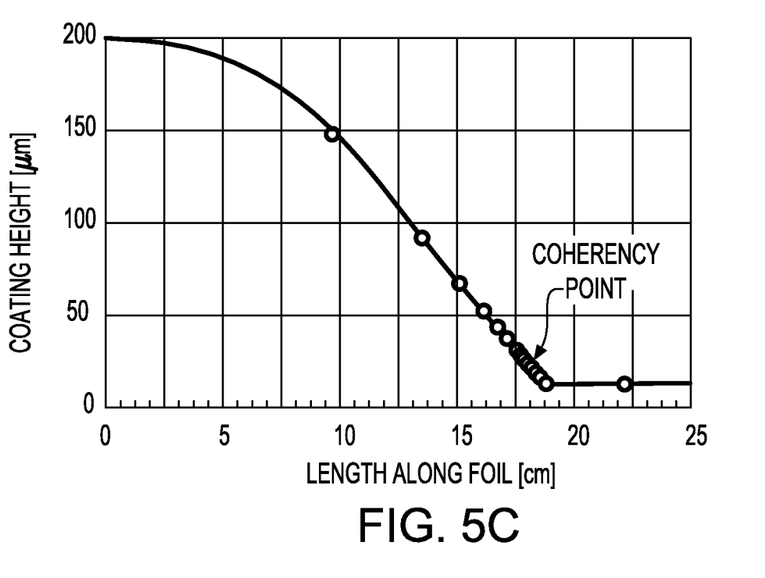
FIG. 5C is plot of the coating thickness for drying the coating of the cast slurry as a function of the length along the foil at a foil speed of 35 cm/min with an empirical evaporation factor ($\beta$) equal to 5.0e-4, in accordance with one embodiment of the present disclosure.

When the natural convection or forced convection is not well characterized, such that the use of mass transport correlations (Welty et al. 2007) is precluded, then the evaporation rate can be given by equation 8, which involve one empirical factor, $\beta$. This parameter describes the deviation of the evaporation flow rate from that predicted by Hertz-Knudsen equation. In some embodiments, this parameter has to be determined from experimental data and other models would be considered for the evaporation rate. In one example, in which a casting slurry is dried in an oven 30 similar to FIG. 3, since data on convection temperatures, radiation temperatures, and heat transfer coefficient due to convection are not typically available for the all the regions in the oven 30, to provide the empirical factor $\beta$ experimentally these variables are varied until a good agreement can be obtained between the measured data for the back side temperature and a case in which $\beta = 1.0e-5$, as depicted in FIGS. 4A and 4B. The data in FIGS. 4A and 4B show that the temperature of the top surface of the coating, $T_S$, is higher than that of the back side foil, $T_B$; while in the oven, $T_S < T_B$. These two types of differences between $T_S$ and $T_B$ were observed in experimental results. The data was shown as a function of both foil length, as measured from the first roll, and time as this data may be used for other experimental studies of drying and or to obtain actual evaporation rates during a static experiment. For $\beta = 1.0e-5$, the drying was incomplete.

Then $\beta$ was increased, as shown in Table 2, in order to attain complete drying.

TABLE 2

Cases considered for the evaporation coefficient, $\beta$.

| $\beta$, empirical evaporation coefficient | Foil length at which drying is complete [cm] | Comments |
|---|---|---|
| 1.0e-5 | — | incomplete drying |
| 1.0e-4 | — | incomplete drying |
| 1.0e-3 | 16 | drying complete before oven entrance |
| 5.0e-3 | 10 | drying complete before oven entrance |
| 5.0e-4 | 20 | drying complete before oven entrance |
| 2.0e-4 | 65 | drying complete close to the 3-rd roll in the oven |
| 1.5e-4 | 86 | drying complete close to the 4-th roll in the oven |

Figure 6A:
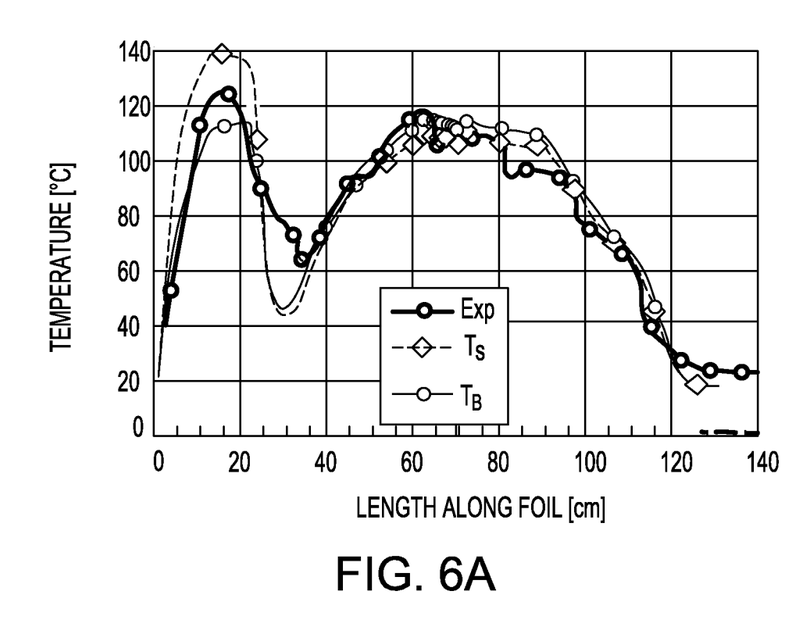
FIG. 6A is a plot of the experimental and computed temperature for drying the coating of the cast slurry as a function of the length along the foil at a foil speed of 35 cm/min with an empirical evaporation factor ($\beta$) equal to 1.5e-4, in accordance with one embodiment of the present disclosure.
Figure 6B:
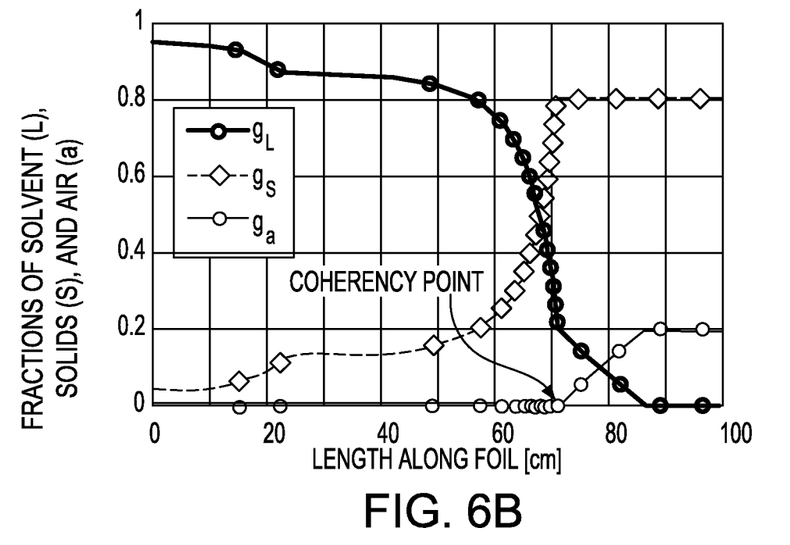
FIG. 6B is a plot of the fractions of solvent (L), solids (s) and air (a) for drying the coating of the cast slurry as a function of the length along the foil at a foil speed of 35 cm/min with an empirical evaporation factor ($\beta$) equal to 1.5e-4, in accordance with one embodiment of the present disclosure.
Figure 6C:
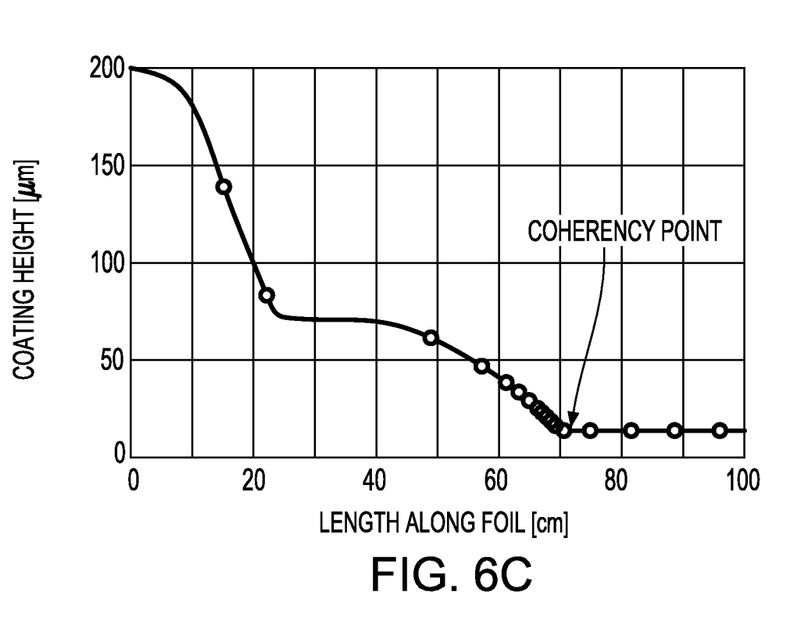
FIG. 6C is plot of the coating thickness for drying the coating of the cast slurry as a function of the length along the foil at a foil speed of 35 cm/min with an empirical evaporation factor (β) equal to 1.5e-4, in accordance with one embodiment of the present disclosure.
Figure 7A:
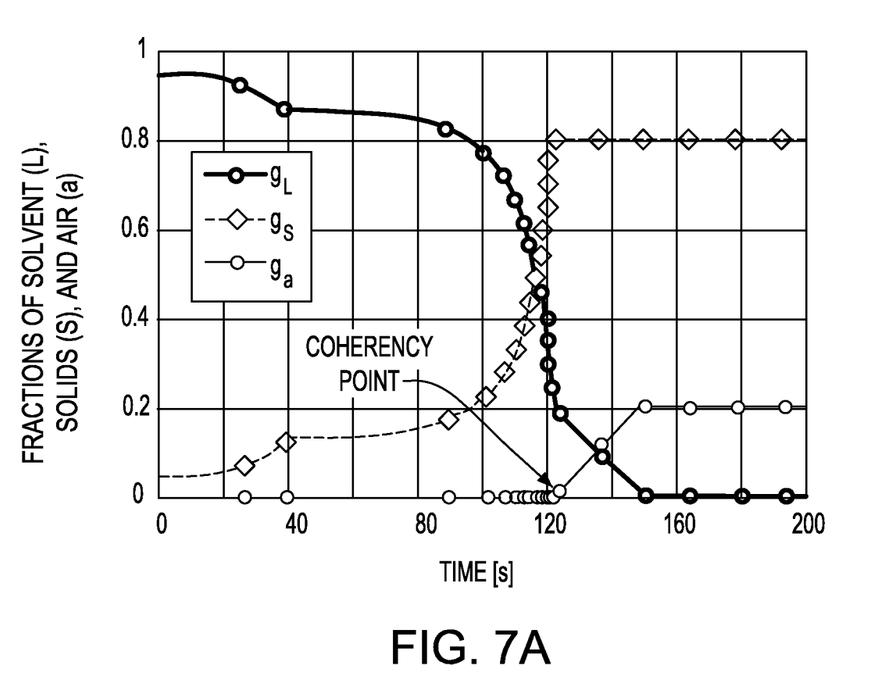
FIG. 7A is a plot of the fractions of solvent (L), solids (s) and air (a) as a function of time for drying the coating at a foil speed of 35 cm/min with an empirical evaporation factor (β) equal to 1.5e-4, in accordance with one embodiment of the present disclosure.
Figure 7B:
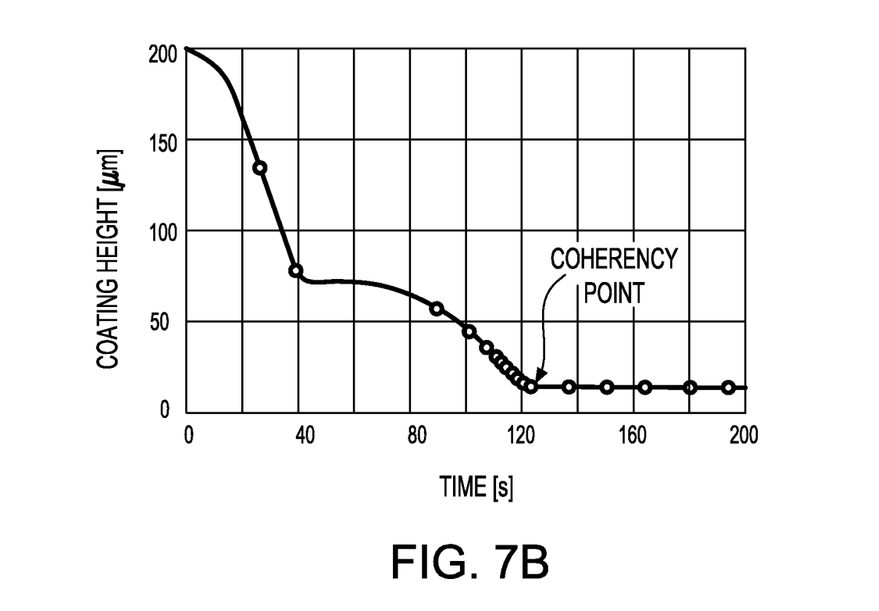
FIG. 7B is a plot of coating thickness as a function of time for drying the coating at a foil speed of 35 cm/min with an empirical evaporation factor (β) equal to 1.5e-4, in accordance with one embodiment of the present disclosure.

The results for two cases are shown in details in FIGS. 4A-6B. The results shown in FIGS. 5A-5C illustrate that when the empirical evaporation coefficient ($\beta$) is equal to 5.0e-4, the drying occurs very quickly that drying is complete at a foil length of 20 cm. Because, so much solvent is evaporated, the temperatures in the foil drop. The temperatures rise once the heat flux due to the evaporation vanishes after the evaporation is complete. In FIG. 5B, the results for the fractions of phases (solvent, solids, and air) are shown. The results show the fast drying that occurred as the foil displaced from the cm location to the 18 cm location. At about 18 cm, the second regime of drying, i.e., the drying after the coherency has been reached proceeds. In this regime, the fraction of solids stays constant and the air enters the coating as the solvent evaporates. In FIG. 5C, the evolution of the coating thickness is shown. After the coherency point has reached, the coating does not shrink any more due to evaporation. In FIGS. 6A-6C, the results are shown for the case in which the empirical evaporation coefficient ($\beta$) is 1.5e-4. Again the coherency point and the second drying regime can be identified from the data shown for the fractions of solvent, solids, or air, as depicted in FIG. 6B. The data with respect to the foil length is shown in FIGS. 6A-6C. The data depicted in FIGS. 6A and 6B is shown as a function of time in FIGS. 7A and 7B.

In some embodiments, the determination of the heat that is needed for optimum drying, and the heat that is lost by the system through evaporation during the drying process, as well as an understanding of the shrinkage of the casting slurry can provide for optimization of the drying process as verified by observation of the drying process using the apparatus depicted in FIG. 1.

In another embodiment, a model was provided for analysis of stress in the casting slurry during drying and an understanding of critical thickness measurements. The model can take into account the binder role on mechanical properties of the coating and electrodes, especially the different behaviors in tension and compression states. The stress model calculates stress-strain in drying coatings on compliant substrates in order to allow for understanding of mechanical behavior of the casting slurry. The stress model provides models for considering the following phenomena/properties: binder effect on elastic properties of the coating; elastic properties of non-homogeneous media; particle packing and solvent capillary effects; and stress-strain formulations for coating drying.

The binder allows particle-to-particle connections holding the composite structure together as a coating. In some embodiments, the binder properties can govern the elastic properties of the composite electrode when in tension, while both the solid particles and binder can affect the elastic properties in compression. Thus, the electrode is expected to have different elastic properties in tension and compression.

In one example, the binder (PVDF) used in the casting slurry is soluble in a solvent of N-Methyl-2-pyrrolidone (NMP). At the solubility point, the binder precipitates out of the solution and becomes part of the solid phase. As for the electrode, the binder keeps particles in contact when they are locally subjected to tensile stresses. In some embodiments, the binder properties would govern the elastic properties of the cast slurry coating when in tension while the solid particles and binder can both affect the elastic properties in compression. Thus, in some embodiments, the coating is expected to have different elastic properties in tension and compression.

Another factor that affects the state of stress in the coating is the particle packing or solid portion of the final coating. Particle packing may occur as a result of solvent loss through evaporation. The coherency point is defined as the instant when there is enough contact among particles such that the network of particles connected through binder ligaments can support stresses, $g_{s,c}$. In other terminologies, the coherency point is referred to as percolation point. Before the coherency point would be reached, the coating surface is mainly covered with solvent and capillary forces are not present. After the coherency point is reached, the meniscus starts to form between particles on the coating surface, and surface tension effects start to affect the particle redistribution in the coating. The solid fraction would increase after the coherency point to its final value, $g_{s,f}$. The term "$g_{L,s,c,f}$" is the volume fraction of solvent/liquid (L), solid (s) as a function of time or during coherency point (c) or final fraction (f). The capillary effects would affect the particle rearrangement between the coherency and final packing point, i.e., $g_{s,c} < g_s < g_{s,f}$. After the final packing point was reached until the end of evaporation, the porosity—or air fraction—starts to increase as the solvent fraction decreases, i.e., $g_s=g_{s,f}$ and $g_a<1-g_{s,f}$. The solvent meniscus, which follows the drying front, is located within the coating. The solvent flow to the drying front occurs through the inter-particle space, whose permeability would vary with the solid fraction, and the liquid pressure effects on the coating particles must be considered.

In one embodiment, stress-strain formulations for coating drying on flexible substrates have been provided considering capillary forces within the coating. In the system considered, the coating is considered to be material of index 1, with the other substrate materials are labeled in increasing order from the coating down. The stress within an elastic isotropic material is given by:

$$\sigma_{ij} = -\frac{E}{1+v}\left(\varepsilon_{ij} + \frac{v}{1-2v}E_V\delta_{ij}\right) - \frac{E}{1-2v}\varepsilon_{th}\delta_{ij} \tag{12}$$

where E is the Young's modulus, v is the Poisson's ratio, and $\Sigma_v$ is the volumetric strain ($\epsilon_v = \epsilon_{ii}$).

The stress within a saturated, porous, and isotropic elastic material is given by:

$$\sigma_{ij} = -\delta_{ij}P_L + \frac{E_{ps}}{1+v_{ps}}\left(\varepsilon_{ij} + \frac{v_{ps}}{1-2v_{ps}}\varepsilon_V\delta_{ij}\right) - \frac{E_{ps}}{1-2v_{ps}}\varepsilon_{th}\delta_{ij} \tag{14}$$

where the subscript "ps" indicate properties of the porous solid matrix (not those of the solid itself) and $P_L = p_L - p_{atm}$ is the gauge pressure in the liquid.

Due to the lack of mechanical loading and the small thickness of the coating and web substrate, the assumption of a bi-axial state of strain/stress is considered to be very appropriate ($\Sigma_{xx}=\epsilon_{yy}$ and $\sigma_{xx}=\sigma_{yy}$). It follows that the stress in the normal direction $\sigma_{zz}=0$ in all the layers in the system considered. Following the derivation for the multilayer films, the strain in the substrate layers can be decomposed into a uniform component, $\epsilon_o$, and a bending component, as:

$$\epsilon = \epsilon_{xx}|_k \epsilon_o + Q(z-z_0) \tag{15}$$

where Q is the reciprocal of the curvature and $z_o$ gives the position of the neutral axis for the multiple layered film.

Thus, it can be shown that the relationships between the in-plane stress, $\sigma_k = \sigma_{xx}|_k$, and in plane strain, $\epsilon = \epsilon_{xx}|_k$, for a layer of index k, are given for the coating as:

$$\sigma_1(\varepsilon, P_L) = E_1'(\varepsilon - \varepsilon_{th,1}) - \frac{1-2v_1}{1-v_1}P_L \tag{16}$$

For the coating, the Young's modulus and the Poisson's ratio are those of the porous solid matrix as indicated in equation (14). From the stress-strain relationship for the normal stress, $\sigma_{zz}=0$, the following relationship, which is referred to as the pressure-strain equation (PSE), can be obtained between $P_L$ and $\epsilon_v$:

$$\frac{P_L}{E_1'} = \frac{(1-v_1)}{(1-2v_1)(1+v_1)}\varepsilon_V - \frac{1}{1-2v_1}\varepsilon_{th,1} - \frac{2}{1+v_1}\varepsilon \tag{18}$$

Another equation, which is termed "void occupancy equation"—to use the poroelasticity terminology—describes the change of the mass of fluid, $\Delta m_L$ in the interparticle space with respect to the initial mass of the fluid, $m_L$, as:

$$-g_L\frac{\Delta m_L}{m_L} + \alpha_B\varepsilon_V + \left(\frac{g_L}{K_L} + \frac{\alpha_B - g_L}{K_S}\right)P_L = 3\varepsilon_{th,SL} \tag{19}$$

where $\epsilon_{th,SL}$ is an equivalent thermal expansion strain of the coating (including the solvent, binder, and solid particles), $K_L$ is the bulk modulus of the liquid phase, $K_S$ is the bulk modulus of the solid phase, $$\alpha_B = 1 - \frac{K_{ps}}{K_S}$$

is the Biot parameter, which depends on the bulk modulus of the porous solid (drained condition) and that of the solid phase itself. Combining the Darcy's law, which relates the fluid velocity to the pressure gradient, and Eigenstrain due to the change in fluid mass, $$\frac{\Delta m_L}{m_L},$$

to the divergence of the fluid velocity, the following relationship can be written:

$$g_L\frac{\Delta m_L}{m_L} = \int_0^t \frac{\partial}{\partial z}\left(\frac{k_{D,L}}{\mu}\frac{\partial P_L}{\partial z}\right)dt \tag{20}$$

and the "void occupancy equation" (VOE), after taking the time derivative, becomes:

$$\alpha_B\dot{\varepsilon}_V + \left(\frac{g_L}{K_L} + \frac{\alpha_B - g_L}{K_S}\right)\dot{P}_L - \frac{k_{D,L}}{\mu}\frac{\partial^2 P_L}{\partial z^2} = 3\dot{\varepsilon}_{th,SL} \tag{21}$$

As it can be seen, the pressure-strain equation (18) can be combined with the void occupancy equation (21) to eliminate $\epsilon_v$ and obtain one master equation for the pressure, $P_L$.

Aside from $\epsilon_v$ and $P_L$ the other unknowns are $\epsilon_v$, Q, and $z_o$. Thus, in some embodiments, three additional equations are needed to complete the systems of equations to provide the above noted unkowns. These additional equations are force balance and momentum balance equations for the entire multilayer system, as it is traditionally considered for bi-axial stressed films. In one embodiment, the force component from the stress due to the liquid pressure contributes to the force balance for the uniform strain component. The resultant force balance due to the uniform strain component (USC) is considered to be given as:

$$\int_{z_2}^{z_1}\sigma_1(\varepsilon_o, P_L)dz + \sum_{k=2}^{N}\int_{z_{k+1}}^{z_k}\sigma_k(\varepsilon_o)dz = 0 \tag{22}$$

while the resultant force balance due to the bending strain component, is:

$$\sum_{k=1}^{N}\int_{z_{k+1}}^{z_k}E_k'Q(z-z_o)dz = 0 \tag{23}$$

From this relationship, it can be easily seen that $z_o$ can be obtained easily as:

$$z_o \left[ \sum_{k=1}^{N} E'_k (z_k - z_{k+1}) \right] = \sum_{k=1}^{N} E'_k \int_{z_{k+1}}^{z_k} z \, dz \quad (24)$$

The momentum balance (MB) is given as:

$$\sum_{k=1}^{N} \int_{z_{k+1}}^{z_k} \sigma_k (z - z_o) dz = 0 \quad (25)$$

Considering now that $z_o$ is known, the uniform strain component (USC) and momentum balance (MB) equations can be cast in the following forms, respectively:

$$\begin{cases} a_{11} \varepsilon_0 + a_{12} \rho - a_{13} \int_{z_2}^{z_1} P_L dz = b_1 \\ a_{12} \varepsilon_0 + a_{22} \rho - a_{13} \int_{z_2}^{z_1} z P_L dz = b_2 \end{cases} \quad (26)$$

In some embodiments, the Young's modulus, Poisson's ratio and the coefficient of thermal expansion are required for the stress analysis. The properties of some examples of different constituent materials for the layers of the web in the casting slurry are shown in Table 2.

TABLE 2

Properties of different substrate constituent materials used in the analysis.

| Material | Inorganic | Organic | Substrate |
|---|---|---|---|
| Elastic Modulus [GPa] | 10 | 2 | 110.3 |
| Poisson's ratio | 0.3 | 0.34 | 0.347 |
| Coefficient of thermal expansion [$\times 10^{-6}$/° C.] | 6.6 | 200 | 16.6 |
| Density [g/cm3] | 2.25 | 1.75 | 8.94 |

Figure 8:
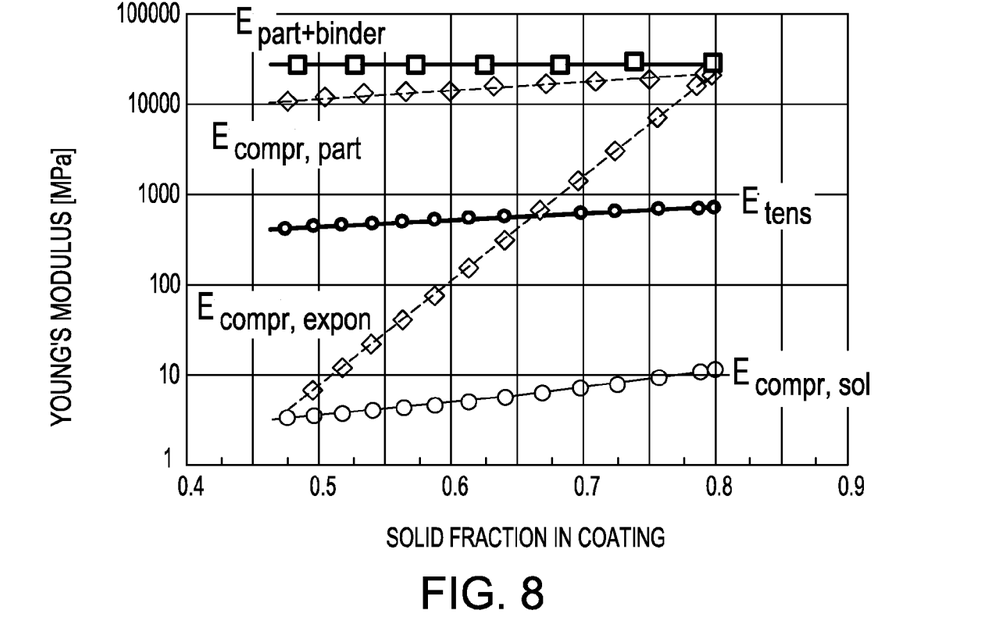
FIG. 8 is a plot of Young's modulus estimations, in accordance with one embodiment of the present disclosure.
Figure 9:
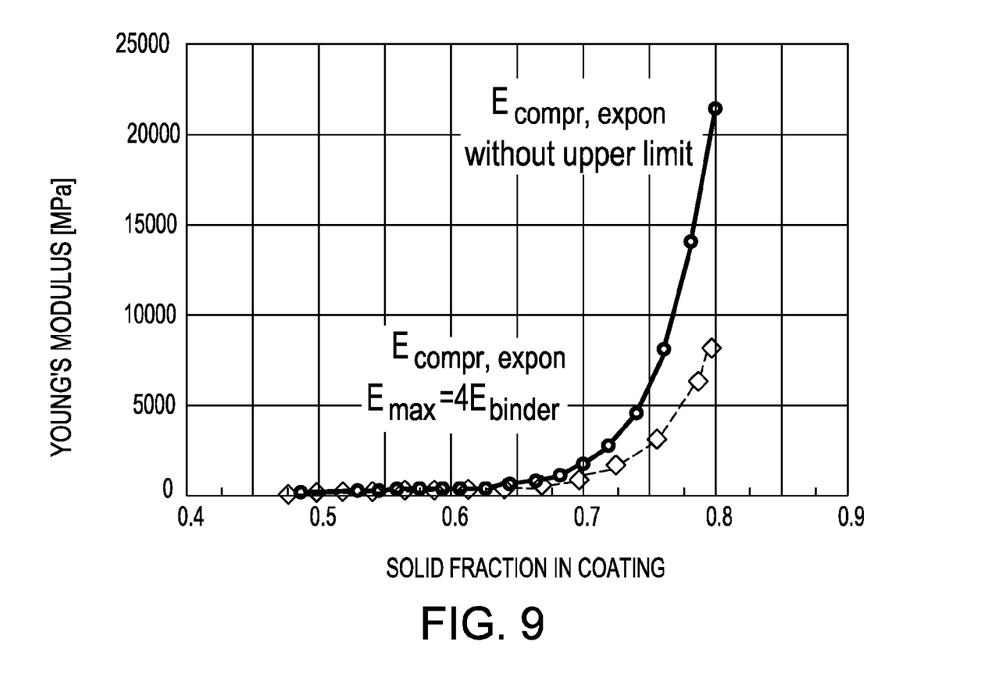
FIG. 9 is a plot of the Young's modulus estimation of the coating, in accordance with one embodiment of the present disclosure.

Data it is presented in FIGS. 8 and 9 for the Young's modulus within the coating. Various formulations have been used to obtain the Young's modulus in the compressive and tensile state. In FIG. 8, the following data is presented:

(a) $E_{compr, sol}$—Young's modulus obtained using Maxwell averaging with solvent as the matrix, (b) $E_{compr, part}$—Young's modulus obtained using Maxwell averaging with solid particles as the matrix, (c) $E_{tens}$—Young's modulus in tension state. This modulus is limited by the binder Young's modulus as $E_{tens} = E_{binder} * g_{binder}$, where $g_{binder}$ indicates the volumetric fraction of the binder (d) $E_{part+binder}$—Young's modulus of the solid matrix material, i.e., considering only the particles and the binder.

The final Young's modulus, $E_{compr, expon}$, was obtained by considering that between the percolation point (taken here at 47% solid loading) and saturation point (taken here 80% solid loading), the Young's modulus varies based on an exponential relationship as a function of interparticle void fraction $E(g_s) = E_0 \exp(-A(1-g_s))$.

In FIG. 9, this data is shown for two cases as the Young's modulus as a function of solid fraction in the coating. In FIG. 9, the upper line represents the data without any upper limit, i.e., just using the Maxwell averaging. In FIG. 9, the lower line represents the data that includes an upper limit for the Young's modulus. In one case, the Young's modulus was not prescribed any upper limit, as given by the Maxwell averaging formula. In another case, i.e., the data that provide the lower line in FIG. 9, it was considered that the maximum Young's modulus in compression is limited by $4 * E_{binder}$.

As shown in FIGS. 8 and 9, the module allows for the calculation and estimation of mechanical properties, namely the Young's modulus, of a resulting coating out of the mechanical behavior of the composite constituents and the amount of liquid in the slurry. It also allows for tracking the Young's modulus as a function of time during drying once an evaporation rate is established. This model allows analysis of stress evolution during drying and correlating the critical thickness measurements with a cracking criteria. Such examples of cracking criteria are: (1) stresses in the coating exceed the yield stress of the binder, (2) stresses in the coating exceed the measured tensile strength of the coating, or (3) a combination thereof. These cracking criteria must be considering at high temperatures during drying and at temperatures experienced during cooling to room temperature, since additional thermal expansion stresses are expected to arise during cooling. The optical microscope can directly provide evidence of coating integrity, including crack nucleation and crack growth.

While the claimed methods and structures has been particularly shown and described with respect to preferred embodiments thereof, it will be understood by those skilled in the art that the foregoing and other changes in form and details may be made therein without departing from the spirit and scope of the presently claimed methods and structures.

What is claimed is:

1. A method of drying casted slurries comprising;

calculating drying conditions from a mathematical drying model for a cast slurry coating comprising a suspension of lithium-containing particles in a solvent and wherein said cast slurry coating has a top surface and an opposing bottom surface;

forming said cast slurry coating on a metal foil substrate suitable for a lithium-ion battery, wherein the opposing bottom surface of the cast slurry coating is in contact with said substrate;

positioning an infrared spot heater on one of either the top or opposing bottom surface of the cast slurry coating and positioning a thermal probe on an opposing side of the cast slurry coating, wherein the infrared spot heater controls the temperature of the cast slurry coating during drying and the thermal probe measures the temperature of the cast slurry coating during drying;

positioning a balance under the opposing bottom surface of the cast slurry coating to measure evaporation of the solvent by weight loss during drying;

and drying the cast slurry coating under the drying conditions from the mathematical drying model while observing the cast slurry coating with an optical microscope of sufficient resolving power to observe microstructural changes in the cast slurry coating during drying.

2. The method of claim 1, wherein the drying conditions result in a cast slurry coating that is free of cracking, free of delamination from the substrate, or a combination thereof.

3. The method of claim 1, wherein said lithium-containing particles have a lithium-containing composition selected from the group consisting of lithium cobalt oxide (LCO), lithium iron phosphate (LFP), lithium manganese oxide (LMO), lithium nickel cobalt aluminum oxide (NCA), lithium titanate (LTO), lithium nickel manganese cobalt oxide (NMC) and combinations thereof.

4. The method of claim 1, wherein said lithium-containing particles have a lithium-containing composition selected from the group consisting of $LiCoO_2$, $LiMn_2O_4$, $LiNiO_2$, $LiFePO_4$, $Li_2FePO_4F$, $LiCo_{1/3}Ni_{1/3}Mn_{1/3}O_2$, $Li(Li_aNi_xMn_y\text{-}Co_z)O_2$, $LiC_6$, $Li_4Ti_5O_{12}$, $Li_{4.4}Si$, $Li_{4.4}Ge$, $LiPF_6$, $LiAsF_6$, $LiClO_4$, $LiBF_4$, $LiCF_3SO_3$ and combinations thereof.

5. The method of claim 1, wherein the forming of the cast slurry coating comprises a roll to roll casting method or a tape casting method.

6. The method of claim 1, wherein the micro-structural changes being observed comprise protuberances, cracks, blisters, delamination and combinations thereof.

7. The method of claim 1, wherein the metal in said metal foil substrate is selected from aluminum and copper.

* * * * *